United States Patent [19]
Sprague et al.

[11] Patent Number: 5,392,526
[45] Date of Patent: Feb. 28, 1995

[54] ANGULARITY GAUGE FOR CYLINDRICAL SURFACES

[75] Inventors: Lewis J. Sprague, Irvine; Jerome A. Fulton, Huntington Beach, both of Calif.

[73] Assignee: Northrop Grumman Corporation, Los Angeles, Calif.

[21] Appl. No.: 116,786

[22] Filed: Sep. 3, 1993

[51] Int. Cl.$^6$ ............................................. G01B 7/30
[52] U.S. Cl. ........................................ 33/529; 33/534; 33/1 N; 340/678
[58] Field of Search ................. 33/412, 529, 533, 534, 33/538, 661, 645, 1 N; 340/678, 686, 689; 200/61.42, 61.48, 61.51

[56] References Cited

U.S. PATENT DOCUMENTS

| | | | |
|---|---|---|---|
| 1,590,499 | 6/1926 | Cozad | 33/512 |
| 2,607,126 | 8/1952 | Sekki | 33/529 |
| 3,331,134 | 7/1967 | Jackson et al. | 33/534 |
| 4,120,095 | 10/1978 | Lebourg | 33/529 |
| 4,413,415 | 11/1983 | Stovall | 33/412 |
| 4,442,606 | 4/1984 | Graham et al. | 33/1 N |
| 4,940,063 | 7/1990 | Challis | 33/534 |
| 5,044,084 | 9/1991 | Pfeiffer | 33/1 N |

FOREIGN PATENT DOCUMENTS

| | | | |
|---|---|---|---|
| 0287149 | 10/1988 | European Pat. Off. | G01B 7/30 |
| 2544485 | 10/1984 | France | 33/1 N |
| 2139365 | 11/1984 | United Kingdom | 33/529 |

*Primary Examiner*—William A. Cuchlinski, Jr.
*Assistant Examiner*—G. Bradley Bennett
*Attorney, Agent, or Firm*—Terry J. Anderson; Karl J. Hoch, Jr.

[57] ABSTRACT

An angularity gauging apparatus for determining if an angle formed between two longitudinally joined cylindrical surfaces is within expected straightness tolerances without requiring a direct measurement. The apparatus includes a fixed locating member and pivotable locating member which respectively interface with the two surfaces being examined. The members are pivotally connected so that angular displacement of their longitudinal axes about the connecting point is possible. A signaling device activates to inform a user when the two surfaces under examination form an angle to each other which equals or exceeds a maximum allowable angle preset into the apparatus. A device is also incorporated for adjusting the apparatus to allow a user to change the angle at which the signaling device activates.

13 Claims, 2 Drawing Sheets

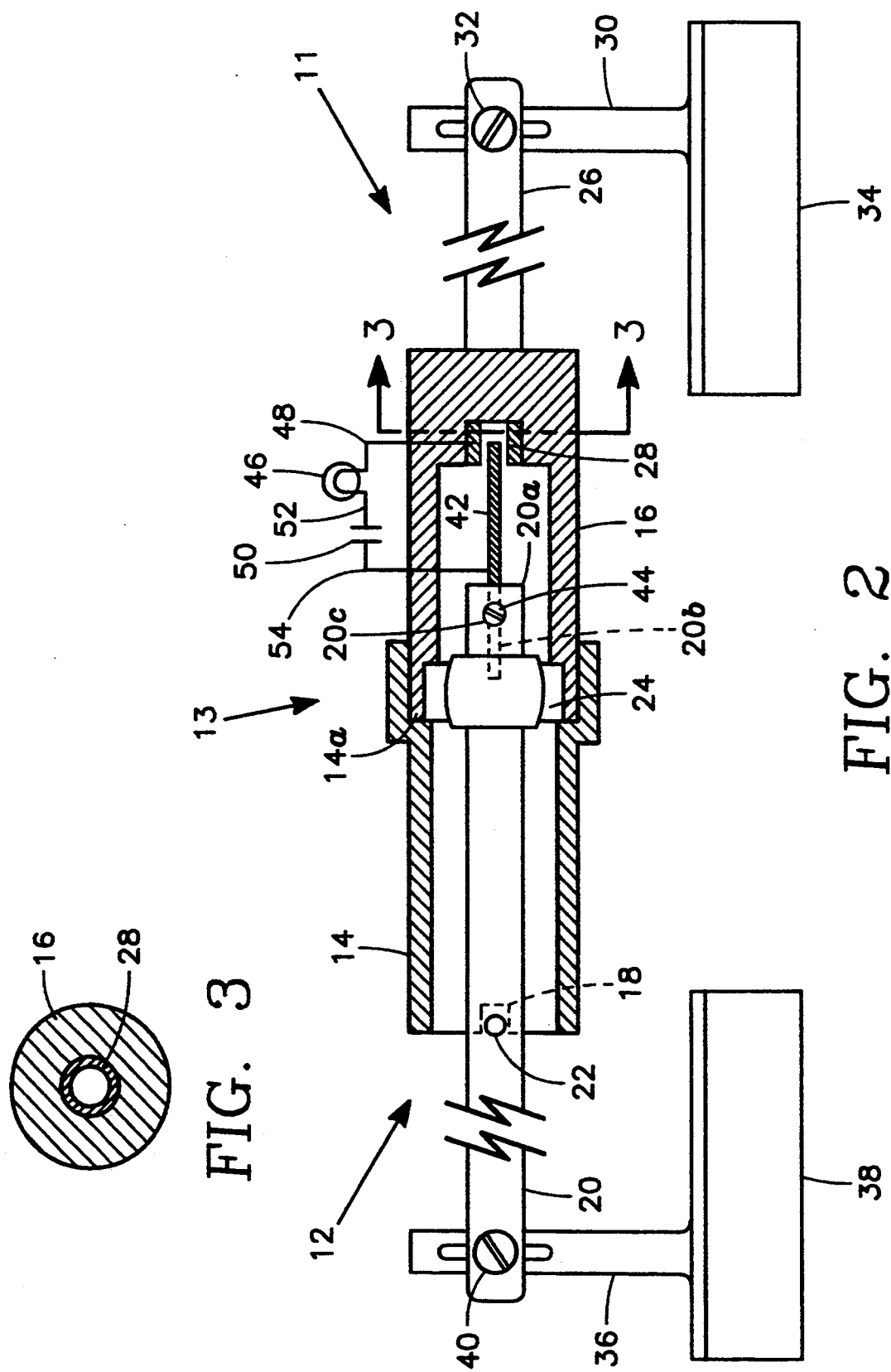

ANGULARITY GAUGE FOR CYLINDRICAL SURFACES

BAGKGROUND OF THE INVENTION

1. Technical Field

The present invention relates generally to a system of determining if the juncture of two longitudinally joined cylindrical surfaces is rectilinear within predefined limits.

2. Background Art

Currently a worker needing to determine whether the straightness of the intersection between two longitudinally joined cylindrical surfaces is within specifications has to employ an extremely inaccurate, complicated, and timeconsuming process requiring the use of scales, markings, and trigonometric calculations. Essentially, any angle existing between the cylindrical surfaces must be directly measured to ascertain whether it exceeds that which is allowed. Ascertaining the straightness of two longitudinally joined cylindrical surfaces, such as two ducts, tubes, or pipes, is critical in situations where a common connector is used to mate these structures. If the angle formed between the structures is excessive, the connector could be overstressed and fail to maintain the required connection or seal.

Manufacturing inspection requirements for advanced, large scale structures and machines, such as a modern framed aircraft, typically necessitate determining the straightness of the junctures between the ends of literally hundreds of joined ducts, tubes, and pipes. These joints are often in hard to access areas where a worker must spend considerable time contorted in awkward positions attempting to directly measure just one of these aforementioned joints.

There is a need for a device which will provide an accurate, instantaneous, go or no-go determination of the straightness of these junctures between the joined ducts, tubes, or pipes. Such a device will reduce inspection times, relieve worker discomfort, and provide more reliable results.

SUMMARY OF THE INVENTION

The present invention is directed to an angularity gauging apparatus that satisfies the need to provide an accurate, instantaneous, go or no-go determination as to whether the juncture between two longitudinally joined cylindrical surfaces is within expected straightness tolerances. This angularity gauge is simply placed anywhere around the circumference of the two joined surfaces, and so long as it straddles the juncture between the two surfaces, the gauge will indicate if a maximum allowable angle has been exceeded. This apparatus includes a fixed locating member with a device for interfacing the fixed locating member with the first of the two surfaces to be gauged, and a pivotable locating member with a device for interfacing the pivotable locating member with the second of the two surfaces to be gauged. The fixed locating member and the pivotable locating member are pivotally connected, preferably by a swivel bearing which allows angular displacement of their longitudinal axes about the bearing.

The first and second interfacing devices each include a locating plate having an elongated angle piece with two flat sides perpendicular to each other along their lengths. The locating plate is attached to the respective fixed and pivotable locating members such that the vertex formed by the outside surface of the locating plate points away from the respective cylindrical surfaces being interfaced with.

The apparatus also includes a device for signaling a user when the two surfaces to be gauged exceed a predetermined angle to each other. This would represent a no-go situation where the joined surfaces are not rectilinear within specified tolerances. In this way the user does not have to directly determine the measure of any angle between the surfaces. This signaling device can be either a light emitting device or an audible sound emitting device, or both. A power source is also part of the signaling device to power it when the device is activated.

There is also a device for limiting the degree to which the fixed and pivotable locating members can pivot in relationship to each other. This movement stabilizing device includes a hollow housing attached to the fixed locating member with a notch that interfaces with a stabilization pin attached to the pivotable locating member such that the sides of the notch restrict travel of the stabilization pin. The fixed and pivotable locating members are thus limited by the stabilizing device to a maximum pivot angle about which they can pivot in relationship to each other. This limiting of the displacement between the locating members facilitates the placement of the angularity gauge onto the surfaces being gauged.

Finally, the angularity gauging apparatus includes a device for adjusting the apparatus to allow a user to change the angle at which the signaling device activates. The process essentially involves adjustment of the aforementioned interfacing device with respect to the rest of the device. This is accomplished with the following structure. A locating member appendage is rigidly attached to the fixed locating member and/or the pivotable locating member. A movable appendage is adjustably attached to the locating member appendage at one end, extending transversely outward from the locating member appendage, and being perpendicularly attached to an interfacing device. The movable appendage and the locating member appendage are fastened together by a device which allows the movable appendage to extend and retract in the transverse direction relative to the locating member appendage, and allows the movable appendage to rotate about the end of the locating member appendage, in a free mode. However, in a fixed mode, this same fastening device allows no movement between the movable appendage and the locating member appendage. The signaling device is controlled by a circuit including an annular shaped electrical contact attached to, but electrically isolated from the fixed locating member. It is also electrically connected to a first connection point of the signaling device. The circuit further includes a conductive contact stem adjustably attached to the pivotable locating member. This stem is extendible and retractable over the full length of the interior of the annular electrical contact, as well as being retractable to clear an end of the electrical contact. The stem is electrically connected to a second connection point of the signaling device. The conductive stem is extended and retracted with an adjustment device.

The angularity gauge is adjusted by first presetting the maximum angle which the joined surfaces are allowed to form in relation to each other. Then, the conductive stem is extended or retracted until it just touches the electrical contact's interior surface. In this way the signaling device is activated, and thereby indicating a "no-go" condition, anytime the angle between the two joined cylindrical surfaces being gauged equals or exceeds the preset angle of the angularity gauge.

BRIEF DESCRIPTION OF THE DRAWINGS

These and other features, aspects, and advantages of the present invention will become better understood with regard to the following description, appended claims, and accompanying drawings where:

FIG. 2 shows the detailed configuration of the angularity gauging apparatus as depicted in FIG. 1.

FIG. 3 is a crossectional view of the angularity gauging apparatus as depicted in FIG. 2 at section 3—3.

DETAILED DESCRIPTION OF THE INVENTION

Figure 1:
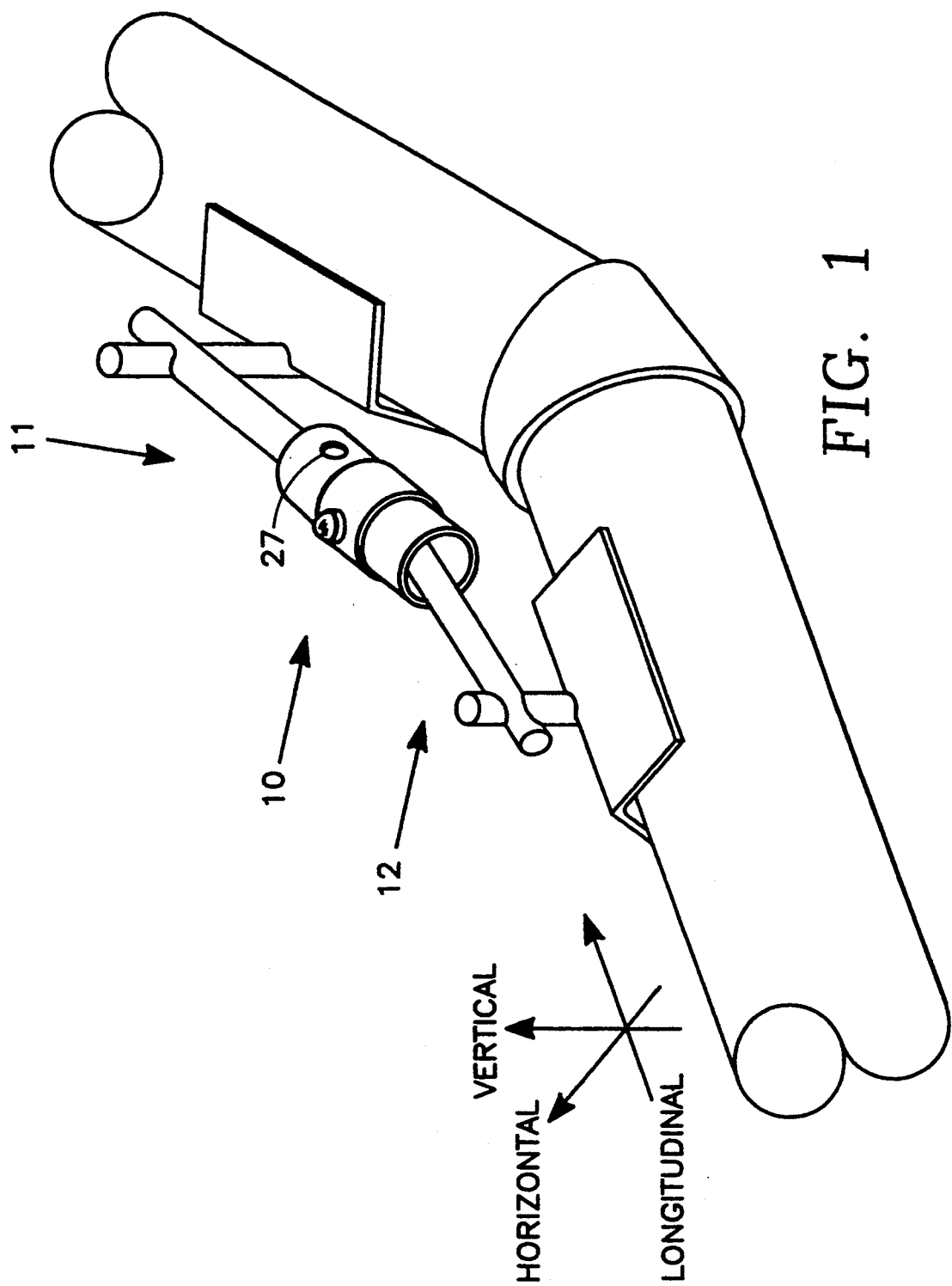
FIG. 1 is an overall view of a angularity gauging apparatus shown as it would be in operation.

An angularity gauge 10 providing for the "go or no-go gauging" of the angular relationship between two longitudinally joined cylindrical surfaces according to the present invention is illustrated in a perspective view in FIG. 1. "Go/no-go gauging" refers to the ability of the angularity gauge 10 to determine whether the angle between two joined surfaces is equal to or exceeds a preset limit, without having to measure the angle directly. If the angle is less than the preset angle, as determined by the angularity gauge 10, it is a "go". If the angle is equal to or exceeds the preset angle, it is a "no-go".

A fixed locating member 11 is rotatably attached to a pivotable locating member 12. Rotation is possible about all the horizontal, vertical, and longitudinal axes, as shown, but in the preferred embodiment of this invention, angular displacement of the longitudinal axes of the two members 11, 12, in relation to each other, is limited to a maximum angle of approximately ten degrees in the vertical and horizontal planes.

FIG. 2 shows the detailed structure of the angularity gauge 10. The fixed locating member 11 includes a hollow housing 13 that is made up of two pads, a female housing 14 and a male housing 16. The male housing 16 has an open end and a closed end. The closed end of the male housing 16 extends approximately one-quarter of the overall length of the housing 16. The female housing 14 is open at both ends and has a recessed area 14a at one end in which the open end of the male housing nests.

The length of the female housing 14 determines in part the extent of rotation of the longitudinal axes of the members 11, 12 in the horizontal and vertical planes as discussed above. If a wider angular limitation is desired, the female housing 14 should be shorter, and if a narrower angular limitation is desired, the female housing 14 should be longer. The other factor that governs the limitation in the relative motion between the fixed and pivotable locating members 11, 12, in the preferred version of the present invention, is a stabilization pin 22 extending radially from a rod 20 of the pivotable locating member 12 and a corresponding rectangular notch 18 in the non-recessed end of the female housing 14. The rod 20 and its pin 22 will be discussed later. The notch 18 is centered about a horizontal plane intersecting the center of the female housing 14. The width of the open side of the notch 18 is such that the rotation of the pivotable locating member's longitudinal axis in the vertical plane, in relation to the fixed member's longitudinal axis, is limited to some desired angle in both directions. This stabilization pin arrangement also restricts the degree to which the two locating members 11, 12 can rotate or twist in relation to each other about their longitudinal axes. The purpose of the stabilization pin arrangement is to restrict the above described movements so that the angularity gauge 10 is easier to handle and place on the cylindrical surfaces being gauged. Without this stabilization, the gauge would flop about and be much more difficult to use in locations when access is tight. The open end of the male housing 16 has a recessed area in which a swivel bearing 24 firmly nests or is press-fitted.

A cylindrical rod 26 extends longitudinally from the center of the external face of the closed end of the male housing 16. There is a cylindrical hole in the center of the interior face of closed end of the male housing 16. An annular electrical contactor bushing 28 is disposed in the hole in the interior face of the male housing 16 and is insulated from the male housing 16, by customary means, such as by an insulative adhesive material. The hole in the interior face of the male housing 16 and the electrical contact 28 are sized such that the longitudinal length of the electrical contact 28 extends into the closed end of the male housing approximately one-half the length of the closed end.

A rectangular bar 30 is adjustably attached to the end of the rod 26 opposite the male housing 16 and extends radially outward from the rod in the vertical plane (as identified in FIG. 1) of the gauge 10. The bar 30 is of sufficient length as to extend beyond the outer surface of the male housing 16, and is attached to the rod 26 by a releasable fastening device 32, such as a screw. The fastening device 32, bar 30, and rod 26 are configured in such a way as to allow the bar 30 to slide back and forth in the transverse direction relative to the rod 26, and to allow the bar 30 to rotate about the end of the rod 26 in the vertical plane, in one mode (i.e. when the fastening device 32 is released), and to allow no movement between the rod 26 and bar 30 in a second mode (i.e. when the fastening device 32 is engaged).

The end of the bar 30 opposite its attachment to the rod: 26 is permanently attached to a locating plate 34, by a method such as welding. The locating plate 34 is attached such that it is perpendicular to the bar and therefore parallel to the housing 13. The locating plate 34 is an elongated structure, being approximately as long as the rod 26. In one version of the invention the locating plate 34 includes an angle piece having two flat surfaces which are perpendicular to each other along their lengths, the outside vertex of which is attached to the end of the rod 26. This version of the locating plate 36 facilitates placement of the angularity gauge 10 on the cylindrical surfaces being gauged, as shown in FIG. 1.

The pivotable locating member 12 includes the rod 20, a bar 36, locating plate 38, and a fastening device 40, such as a screw, attached at its end opposite the housing 13. The bar 36, locating plate 38, and fastening device 40 are identical to the bar 30, locating plate 34, and fastening device 32 described in association with the fixed locating member 11, and are attached in the same manner. The stabilization pin 22 on the rod 20 coincides with the notch 18 in the female housing 14 that was described above. Preferably, the stabilization pin 22 extends slightly beyond the outer surface of the female housing 14. The end 20a of the rod 20 opposite the bar 36, has a first hole 20b extending along the longitudinal axis of the rod 20. A second hole 20c extends into the side of the rod 20 from a point slightly back from the rod's end. A contact stem 42 protrudes into the first hole 20b beyond the point where the second hole 20c enters the rod 20, and extends out from the end of the rod 20. A contact stem adjustment device, such as a threaded screw 44, is installed in the second hole 20c to enable the extension and retraction of the contact stem 42 out of and into the first hole 20b. In one version of the invention the second hole 20c intersects the first hole 20b at approximately the midpoint of the first hole 20b. The screw 44 holds the contact stem 42 in place when tightened, and allows the contact stem 42 to be extended from or retracted into the rod 20 when loosened. In another version of the invention, the second hole crosses perpendicular to and at a different elevation than the first hole, such that the two holes adjacently open into each other at their juncture. This common juncture allows the contact stem adjustment device 44 to be any one of a number of well-known devices that when rotated within the second hole will extend or retract the contact stem 42 depending on the direction of rotation.

There is an opening 27 in the male housing 16 which allows access to the contact stem 42 and the contact stem adjustment device 44, as shown in FIG. 1.

The end 20a of the rod 20 is disposed through the swivel bearing 24 and the contact stem 42 is positioned within the hollow interior of the electrical contact 28. The contact stem 42 is capable of being extended and retracted the full length of the electrical contact 28, and can be retracted to a point where its tip clears the end of the electrical contact 28.

A signaling device 46 is integrated into the housing 13 of the fixed locating member 11. This signaling device 46 can be any well-known device which emits light, sound or both, such as an electric light or buzzer. One side of the signaling device 46 is connected to the electrical contact 28, via an electrical signal conduit 48, such as an electrical wire. The other side of the signaling device 46 is connected to one side of a power source 50, such as a dry cell battery, also via an electrical signal conduit 52. The other side of the power source 50 is connected via an electrical signal conduit 54 to the contact stem 42. The above configuration allows the signal device 46 to be activated when the contact stem 42 touches the interior surface of the electrical contact 28.

The angularity gauge 10 of this invention is used to gauge whether the juncture between two longitudinally joined cylindrical surfaces is straight within a predetermined limit. This is accomplished by presetting the invention to activate its signaling device 46 when the angle between the fixed locating member 11 and the pivotable locating member 12 equals or exceeds the predetermined limit that has been specified for the joined cylindrical surfaces. The angularity gauge 10 is placed so that the centerline of the rotatable attachment point (i.e., the center of the swivel bearing 24) between the fixed locating member 11 and the pivotable locating member 12 is directly over the intersection of the two cylindrical surfaces that are to be gauged. The locating plate 34 of the fixed locating member 11 is firmly placed against one of the cylindrical surfaces so that the surface is contacted over the entire length of the plate. Then, the pivotable locating member's locating plate 38 is placed flush against the surface of the other cylindrical surface, in a manner identical the other plate 34. As will be discussed below, the angularity gauge 10 is preset at a desired angle such that when that angle is reached the signaling device 46 activates.

If the pivotable locating member's locating plate 38 is placed flush with the other cylindrical surface and the signaling device 46 is not activated, then it is determined that the angle between the two surfaces is less than the preset angle. This constitutes a "go" condition indicating the two cylindrical surfaces are rectilinear within the desired limit. However, if the pivotable locating member's locating plate 38 is placed flush against the other cylindrical surface, and the signaling device 46 is activated, it is determined that the angle between the cylindrical surfaces is equal to or exceeds to the preset angle. This constitutes a "no-go" condition indicating the straightness of the juncture between the cylindrical surfaces is out of the desired specifications. Accordingly, a user can determine whether the juncture of two longitudinally joined cylindrical surfaces, such as two tubes or two circular ducts, conforms to straightness specifications on a go/no-go basis without having to measure the angle directly. It should be noted that the above procedure could be modified to place the pivotable locating member's locating plate 38 against the one of the cylindrical surfaces first, and then place the fixed locating member's locating plate 34 against the other surface as described above in connection with the pivotable locating member's locating plate. The results would be the same.

it does not matter where around the circumference of the cylindrical surface that the locating plates 34, 38 are placed. This results from the electrical contact 28 being annular in shape. For instance, assume that the juncture of two cylindrical pipes has an angle associate therewith which exceeds the preset angle of the gauge 10. If the angularity gauge 10 is positioned directly within the vertex of the angle formed by the surfaces, the contact stem 42 would contact one side of the interior surface of the electrical contact 28. If the angularity gauge 10 were placed on the other side of the same juncture from the aforementioned vertex, the contact stem would contact the opposite side of the electrical contact's interior surface. If the angularity gauge were placed on the surfaces at either side of the of the angle formed (i.e. 90 degrees from the vertex position), the fixed and pivotal locating members 11,12 would be force to form an angle to each other in the horizontal plane, instead of the vertical plane as in the first to instances. Regardless, the signaling device would still be activated as the contact stem 42 would touch the interior surface of the electrical contact 28 at a position 90 degrees from that of either of the first two instances. Similarly, if the angularity gauge where placed anywhere around the circumference of the joined pipes in this example, the contact stem 42 would contact the interior surface of the electrical contact 28 someplace along its circumference. The gauge 10 may be placed anywhere around the circumference of the joined cylindrical surfaces to be gauged, provided the pivot point of the gauge 10 is positioned directly over the juncture of the surfaces.

As stated above, the angularity gauge 10 of this invention is preset to activate its signaling device 46 when the angle between the fixed locating member 11 and the pivotable locating member 12 is equal to or exceeds the maximum allowable angle between the joined cylindrical surfaces being gauged. The angularity gauge 10 is preset by use of an angle standard unit. This angle standard unit can be any one of a number of well-known devices and is not part of the present invention. Essentially, the angle standard unit consists of two longitudinally joined cylindrical surfaces whereby a known angle is formed between them in a common plane. In some cases this angle standard unit may be adjustable such that the just-described angle is changeable and can be set at any angle.

The angularity gauge 10 is preset by the following method. First, the contact stem 42 is fully retracted to prevent damage during the presetting operation. Next, the fixed locating member's bar 30 is locked into a position whereby it is at the midpoint of its maximum extension and is perpendicular to the attached rod 26, utilizing the associated fastening device 32. The fixed locating member's locating plate 34 is then placed flush with one of the angle standard unit's cylindrical surfaces whereby the plate contacts the surface along its entire length and the centerline of the rotatable attachment point between the fixed locating member 11 and the pivotable locating member 12 is directly over the intersection where the two cylindrical surfaces are joined. The plate 34 is then held in place. As described above, it does not matter where on the circumference of the cylinder that the plate 34 is placed. Next, the fastening device 40 that connects and holds the pivotable locating member's rod 20 to its adjustable bar 36 is released. The locating plate 38 is placed flush with the surface of the second cylindrical surface such that the plate 38 contacts the surface along its entire length. The pivotable locating plate 38 is then held in place and the pivotable locating members rod 20 is rotated toward or away from the second cylindrical surface, thereby sliding the bar 36 in relation to the rod 20, until the stabilization pin 22 is approximately in the middle of the associated notch 18. At this point the fastening device 40 is engaged. It is noted that if the desired preset angle is so extreme that the pivotal locating plate 38 can not be made flush with the second surface due to interference between the stabilization pin 22 and the notch 18, the fixed locating member's bar 30 can be released and slid in relation to the associated rod 26, until the aforementioned interference condition is relieved. Finally, the contact stem 42 is extended until the signaling device 46 is activated. The signaling device 46 will activate whenever the angle between the fixed and pivotable locating members 11,12 is equal to or exceeds the preset angle. The angularity gauge 10 is now ready to determine, on a go/no-go basis, if the juncture between a pair of longitudinally joined cylindrical surfaces is rectilinear within a specified limit in accordance with the methods previously described.

Of course, in presetting the angularity gauge 10 to a desired angle the above-described roles of the fixed locating member 11 and the pivotable locating member 12 can be reversed.

The preferred proportions of the components that make up the angularity gauge 10 are shown in FIG. 2. The gauge 10 can be made of any appropriate material. However, metal construction would be preferred for ruggedness purposes. It is also preferred that the contact stem 42 be made of a conductive material that is sufficiently elastic and shape retentive that it can withstand moderate deflection against the inner wall of the electrical contact 28, when the angle of the gauged surfaces exceeds the preset angle, and still return to its original straight configuration.

Although the present invention has been described in considerable detail with reference to certain versions thereof, other versions are possible. Therefore, the spirit and scope of the appended claims should not be limited to the description of the versions of the invention contained herein.

What is claimed is:

1. An apparatus for gauging whether a juncture between two longitudinally joined cylindrical surfaces is rectilinear within a predetermined limit on a go/no-go basis, the apparatus comprising:
   (a) a fixed locating member including a first means for interfacing the fixed locating member with a first of the two surfaces to be gauged;
   (b) a pivotable locating member including a second means for interfacing the pivotable locating member with a second of the two surfaces to be gauged;
   (c) means for pivotally connecting the fixed locating member with the pivotable locating member; and,
   (d) means for signaling a user whenever the two cylindrical surfaces to be gauged form an angle which one of (i) equals, and (ii) exceeds the predetermined limit, thereby providing a go/no-go signal to the user, said means for signaling comprising
   a signaling device having first and second electrical connection points,
   an annular electrical contact attached to and electrically isolated from the fixed locating member and connected via first electrical signal means to said first electrical connection point, and
   an electrically conductive contact stein adjustably attached to the pivotable locating member such that the stein is extendible and retractable over a full length of an interior of the annular electrical contact and retractable to clear a proximal end of the annual electrical contact, the stem being connected via second electrical signal means to said second electrical connection point.

2. The gauging apparatus of claim 1 further comprising stabilization means for limiting the degree to which the fixed and pivotable locating members can pivot in relationship to each other.

3. The gauging apparatus of claim 2 wherein the stabilization means includes a hollow housing attached to the fixed locating member with a notch that interfaces with a stabilization pin attached to the pivotable locating member such that the sides of the notch restrict travel of the stabilization pin.

4. The gauging apparatus of claim 1 wherein said signaling means further comprises:
   (a) means for controlling extension and retraction of the contact stem; and,
   (b) an opening in said hollow housing of the fixed locating member for accessing the means for controlling.

5. The gauging apparatus of claim 1 wherein said signaling means further comprises means for adjusting the apparatus to allow a user to change the angle at which the signaling means activates.

6. The gauging apparatus of claim 5 wherein the adjusting means comprises:
   (a) a locating member appendage rigidly attached to at least one of (i) the fixed locating member, and (ii) the pivotable locating member;
   (b) a movable appendage adjustably attached to the locating member appendage at one end, extending transversely outward from the locating member appendage, and being perpendicularly attached to the corresponding one of (i) the first interfacing means, and (ii) the second interfacing means; and, (c) means for fastening the movable appendage to the locating member appendage so that the movable appendage is extendible and retractable in the transverse direction relative to the locating member appendage, and the movable appendage is rotatable about the end of the locating member appendage in a free mode, and the movable appendage and the locating member appendage are immovable relative to one another in a fixed mode.

7. The gauging apparatus of claim 1 wherein the first and second interfacing means each comprises a locating plate including an elongated angle piece with two flat sides perpendicular to each other along their lengths, the locating plate attached to the respective fixed and pivotable locating members such that the vertex formed by the outside surface of the locating plate points away from the respective cylindrical surfaces being interfaced with.

8. The gauging apparatus of claim 1 wherein the pivoting means comprises a swivel bearing which allows angular displacement of the longitudinal axes of the fixed and pivotable locating members about the bearing.

9. The gauging apparatus of claim 1 wherein the signaling device comprises:
(a) one of (i) a light emitting device, (ii) an audible sound emitting device, and (iii) a light emitting device combined with an audible sound emitting device, for signaling a user; and,
(b) a power source connected to the signaling device to power the device when it is activated.

10. An apparatus for gauging whether a juncture between two longitudinally joined cylindrical surfaces is rectilinear within a predetermined limit on a go/no-go basis, the apparatus comprising:
(a) a fixed locating member including a first means for interfacing the fixed locating member with a first of the two cylindrical surfaces to be gauged, the first interfacing means comprising a first locating plate including a first elongated angle piece with two flat sides perpendicular to each other along their lengths, the first locating plate being attached to the fixed locating member such that a first vertex formed by an intersection of the flat sides of the first locating plate points away from the first cylindrical surface being interfaced with;
(b) a pivotable locating member including a second means for interfacing the pivotable locating member with a second of the two cylindrical surfaces to be gauged, the second interfacing means comprising a second locating plate including a second elongated angle piece with two flat sides perpendicular to each other along their lengths, the second locating plate being attached to the pivotable locating member such that a second vertex formed by an intersection of the flat sides of the second locating plate points away from the second cylindrical surface being interfaced with;
(c) means for pivotally connecting the fixed locating member with the pivotable locating member, the pivotally connecting means comprising a swivel bearing which allows angular displacement of longitudinal axes of the fixed and pivotable locating members about the swivel bearing;
(d) stabilization means for limiting the degree to which the fixed and pivotable locating members can pivot in relationship to each other, the stabilization means comprising a hollow housing attached to the fixed locating member with a notch that interfaces with a stabilization pin attached to the pivotable locating member such that sides of the notch restrict travel of the stabilization pin;
(e) means for signaling a user whenever the two cylindrical surfaces to be gauged form an angle which one of (i) equals, and (ii) exceeds the predetermined limit, thereby providing a go/no-go signal to the user, the signaling means comprising
a signaling device having first and second electrical connection points,
an annular electrical contact attached to and electrically isolated from the fixed locating member, and connected via first electrical signal means to the first electrical connection point, and
an electrically conductive contact stem adjustably attached to the pivotable locating member such that the contact stem is extendible and retractable over a full length of an interior of the annular electrical contact and retractable to clear a proximal end of the annular electrical contact, the contact stem being connected via second electrical signal means to the second electrical connection point; and,
(f) means for adjusting the apparatus to allow the user to change the predetermined limit at which the signaling means activates.

11. The gauging apparatus of claim 10 herein said signaling means further comprises:
(a) means for controlling extension and retraction of the contact stem; and,
(b) an opening in said hollow housing of the fixed locating member for accessing the means for controlling.

12. The angle gauging apparatus of claim 11 wherein the signaling device comprises:
(a) one of (i) a light emitting device, (ii) an audible sound emitting device, and (iii) a light emitting device combined with an audible sound emitting device, for signaling the user; and,
(b) a power source connected to the signaling device to power the device when it is activated.

13. The angle gauging apparatus of claim 12, wherein the adjusting means comprises:
(a) a locating member appendage rigidly attached to at least one of (i) the fixed locating member, and (ii) the pivotable locating member;
(b) a movable appendage adjustably attached to the locating member appendage at one end, extending transversely outward from the locating member appendage, and being perpendicularly attached to the corresponding one of (i) the first interfacing means, and (ii) the second interfacing means; and,
(c) means for fastening the movable appendage to the locating member appendage so that the movable appendage is extendible and retractable in the transverse direction relative to the location member appendage, and the movable appendage is rotatable about the end of the location member appendage in a free mode, and the movable appendage and the locating member appendage are immovable relative to one another in a fixed mode.

* * * * *